(12) United States Patent
Morris et al.

(10) Patent No.: US 10,148,578 B2
(45) Date of Patent: Dec. 4, 2018

(54) OPTICAL AND PACKET PATH COMPUTATION AND SELECTION SYSTEMS AND METHODS

(71) Applicants: Todd Morris, Stittsville (CA); Romualdas Armolavicius, Stittsville (CA); Petar Djukic, Ottawa (CA)

(72) Inventors: Todd Morris, Stittsville (CA); Romualdas Armolavicius, Stittsville (CA); Petar Djukic, Ottawa (CA)

(73) Assignee: Ciena Corporation, Hanover, MD (US)

( * ) Notice: Subject to any disclaimer, the term of this patent is extended or adjusted under 35 U.S.C. 154(b) by 544 days.

(21) Appl. No.: 14/516,985

(22) Filed: Oct. 17, 2014

(65) Prior Publication Data

US 2016/0112327 A1    Apr. 21, 2016

(51) Int. Cl.
| | | |
|---|---|---|
| *H04Q 11/00* | (2006.01) | |
| *H04L 12/801* | (2013.01) | |
| *H04L 12/729* | (2013.01) | |
| *H04L 12/733* | (2013.01) | |

(52) U.S. Cl.
CPC .......... *H04L 47/127* (2013.01); *H04L 45/125* (2013.01); *H04Q 11/0062* (2013.01); *H04L 45/122* (2013.01); *H04Q 2011/0073* (2013.01)

(58) Field of Classification Search
CPC ................................................. H04Q 11/0066
See application file for complete search history.

(56) References Cited

U.S. PATENT DOCUMENTS

| | | | |
|---|---|---|---|
| 7,500,013 B2 | 3/2009 | Dziong et al. | |
| 7,859,993 B1 | 12/2010 | Choudhury et al. | |
| 8,111,612 B2 | 2/2012 | Dziong et al. | |
| 8,457,001 B2 | 6/2013 | Madrahalli et al. | |
| 8,467,375 B2 | 6/2013 | Blair | |
| 8,509,005 B2 | 8/2013 | Khan et al. | |
| 8,553,707 B2 | 10/2013 | Swinkels et al. | |
| 2002/0097671 A1* | 7/2002 | Doverspike | H04J 14/0227 370/216 |

(Continued)

FOREIGN PATENT DOCUMENTS

WO      2014139427 A1    9/2014

OTHER PUBLICATIONS

Altman et al. ("Altman") (Altman et al.; Network Control and Optimization—Second Euro-NF Workshop, NET-COOP 2008; NY, Springer Berlin Heidelberg, 2009. p. 47-48).*

(Continued)

*Primary Examiner* — Nathan M Cors
(74) *Attorney, Agent, or Firm* — Clements Bernard Walker PLLC; Christopher L. Bernard; Lawrence A. Baratta, Jr.

(57) ABSTRACT

A method for path computation in a network includes determining dynamic link weights for links in the network, responsive to a request for a path, for a connection, between a source node and a destination node in the network with a requested bandwidth amount, wherein the dynamic link weights, for each link, are based on a current status of the link and a future status of the link; determining one or more paths for the request based on the dynamic link weights; and selecting a path of the one or more paths to minimize cost in the network. The method can be implemented through a Software Defined Networking (SDN) controller.

15 Claims, 12 Drawing Sheets

(56) References Cited

U.S. PATENT DOCUMENTS

| | | | |
|---|---|---|---|
| 2004/0205239 A1* | 10/2004 | Doshi | H04J 14/0227 709/241 |
| 2006/0140119 A1* | 6/2006 | Yeh | H04L 49/254 370/235 |
| 2006/0209838 A1* | 9/2006 | Jung | H04L 43/0894 370/394 |
| 2012/0051745 A1 | 3/2012 | Srinivasan et al. | |
| 2013/0176846 A1 | 7/2013 | Callard et al. | |
| 2013/0259465 A1 | 10/2013 | Blair | |
| 2014/0133391 A1 | 5/2014 | Djukic et al. | |
| 2014/0229210 A1 | 8/2014 | Sharifian et al. | |
| 2014/0258463 A1* | 9/2014 | Winterrowd | H04L 65/4084 709/219 |
| 2015/0215688 A1* | 7/2015 | Sambo | H04J 14/0267 398/48 |

OTHER PUBLICATIONS

Ma et al., "On Path Selection for Traffic with Bandwidth Guarantees," Computer Science Department, Carnegie Mellon University, pp. 1-12, Oct. 1997.

McQuillan et al., "The New Routing Algorithm for the ARPANET," IEEE Transactions on Communications, vol. COM-28, No. 5, May 1980, pp. 711-719.

Apostolopoulos, et al., "QoS Routing Mechanisms and OSPF Extensions," Network Working Group, Request for Comments: 2676, Category: Experimental, pp. 1-50, Aug. 1999.

\* cited by examiner $$P(u) = \begin{cases} 1, & u_i < C_{\lim} \\ 1 + \dfrac{1}{M} e^{\frac{(u-C_{\lim})}{a}}, & C_{\lim} \le u_i < 1 \end{cases}$$

$$a = \frac{1 - C_{\lim}}{\log(M) + \log(P_{\max})}$$

OPTICAL AND PACKET PATH COMPUTATION AND SELECTION SYSTEMS AND METHODS

FIELD OF THE DISCLOSURE

The present disclosure relates generally to networking systems and methods. More particularly, the present disclosure relates to optical and packet path computation systems and methods.

BACKGROUND OF THE DISCLOSURE

Networks are moving away from services as long-term static end-to-end connections to on-demand services with dynamic end-to-end connections ("connections"). On-demand connections may be requested with fixed bandwidth requirements or with elastic bandwidth requirements, and they may have the requirement of starting immediately or delayed in time. Efficient build-up of on-demand networks considers the fact that not all traffic is on the network at the same time. In other words, the network design takes into consideration the statistical multiplexing of end-to-end connections on a link and network level and allocates less capacity than is required to run all traffic at its peak bandwidth. Naturally, there may be times of congestion when many of the traffic flows do come into the network and cause a temporary overload.

With this type of network in mind, it is clear that static path computation or path computation which does not consider the network status may cause problems in the times of congestion. Consider shortest-path path computation in a network that has a bottleneck link for many paths, during the times of congestion, this link will become overloaded, causing blocking. If there are many bottleneck links in the network, fixed path computation may cause loss of throughput. This may happen if some connections are put on their shortest path, when in fact they should have been routed alternatively to keep the shortest path clear for other connections. One example where this may happen is if short-term connections are allocated bandwidth on bottleneck links and are blocking long-term connections from entering the network. This type of resource allocation may cause lower throughput and revenue over the long run, if once the short-term connections leave the network the long-term connections have moved on to another service provider.

To prevent throughput loss, path computation for on-demand connections should at least observe the current network status when finding paths for new connections to avoid full utilization of bottle-neck links. A typical path computation approach with network status information is an adaptive path computation, which adds a penalty on the links with high utilization so that shortest-path algorithms avoid the link in the times of congestion. This solves the previous problem of blocking shortest paths too soon into congestion. The adaptive path computation approach routes a connection to avoid blocking bottleneck links, leaving some free bandwidth on these links, if the congestion increases further. However, in the times of overload, this approach may cause "throughput collapse" in the network. Throughput collapse happens if too many connections are routed on long paths. This causes a congestion positive feedback loop, where links which would normally not be congested due to traffic patterns (the overload traffic patterns) now become congested due to congestion avoidance of the adaptive path computation, causing links throughout the network to block. In the case of overload, the path computation should perform some actions to prevent network-wide link blocking.

The aforementioned path computation problems related to when the connections require instantaneous bandwidth. However, these problems also exist when the connections will require bandwidth in the future. Indeed, any type of path computation for on-demand networks should use the knowledge of the future network status and future forecast network status, when scheduling connections in the future to prevent future link blocking. It may also need to perform actions to prevent future throughput collapse. However, conventional approaches in adaptive routing and path computation do not consider future knowledge of the network status, which is necessary to prevent congestion from future traffic as well as connection rejection mechanisms which prevent throughput collapse.

BRIEF SUMMARY OF THE DISCLOSURE

In an exemplary embodiment, a method for path computation in a network includes determining dynamic link weights for links in the network, responsive to a request for a path, for a connection, between a source node and a destination node in the network with a requested bandwidth amount, wherein the dynamic link weights, for each link, are based on a current status of the link and a future status of the link; determining one or more paths for the request based on the dynamic link weights; and selecting a path of the one or more paths to minimize cost in the network. The links with insufficient capacity for the requested bandwidth based on the current status or the future status can be given a dynamic link weight of infinity or an extremely high value. The dynamic link weights can be determined from static link weights assigned to each of the links with a penalty added therein based on the current status and the future status. The dynamic link weights can be computed at run-time for each new request based on the current status and future status at run-time.

The method can further include determining costs of the one or more paths, wherein the cost is determined based on a length of the path, and wherein, if a length of the one or more paths is longer than a prescribed threshold, the cost of the one or more paths is set to infinity or an extremely high value. The future status can incorporate any of planned capacity increases, estimated capacity increases, planned traffic, and estimated traffic, for each of the links. The selecting the path, to minimize cost, considers cost to add the connection to the network and rejects the connection if the cost is too high even if sufficient capacity is available. The method can further include determining a network graph based on a topology of the network with the dynamic link weights assigned to the network graph and with the network graph incorporating multiple network layers therein; wherein the determining one or more paths utilizes the network graph with the dynamic link weights and an associated path computation algorithm. The method can be implemented in conjunction with a Software Defined Networking (SDN) controller.

The dynamic link weights can be determined based on modification of static link weights reflecting any of costs of technologies from multiple-layers in the network, current availability of bandwidth in the network, and future availability of bandwidth in the network. The dynamic link weights can be determined based on link weight adjustment for congestion control which provides a penalty based on link utilization. The method can further include performing link pruning to remove links without sufficient capacity. The method can further include determining a path bound or a reservation trigger for a cost threshold used in the selecting step.

In another exemplary embodiment, a controller configured to perform path computation in a network includes a network interface communicatively coupled to one or more nodes in the network; a processor communicatively coupled to the network interface; and memory storing instructions that, when executed, cause the processor to determine dynamic link weights for links in the network, responsive to a request for a path through the network interface, for a connection, between a source node and a destination node in the network with a requested bandwidth amount, wherein the dynamic link weights, for each link, are based on a current status of the link and a future status of the link, determine one or more paths for the request based on the dynamic link weights, and select a path of the one or more paths to minimize cost in the network.

The links with insufficient capacity for the requested bandwidth based on the current status or the future status can be given a dynamic link weight of infinity or an extremely high value, wherein the dynamic link weights are determined from static link weights assigned to each of the links with a penalty added therein based on the current status and the future status, and wherein the dynamic link weights are computed at run-time for each new request based on the current status and future status at run-time. The memory storing instructions that, when executed, can further cause the processor to determine costs of the one or more paths, wherein the cost is determined based on a length of the path, and wherein, if a length of the one or more paths is longer than a prescribed threshold, the cost of the one or more paths is set to infinity or an extremely high value.

The path can be selected to minimize cost by considering cost to add the connection to the network and the path is rejected for the connection if the cost is too high even if sufficient capacity is available. The memory storing instructions that, when executed, can further cause the processor to determine a network graph based on a topology of the network with the dynamic link weights assigned to the network graph and with the network graph incorporating multiple network layers therein; wherein the one or more paths are determined using the network graph with the dynamic link weights and an associated path computation algorithm. The dynamic link weights can be determined based on modification of static link weights reflecting any of costs of technologies from multiple-layers in the network, current availability of bandwidth in the network, and future availability of bandwidth in the network.

In a further exemplary embodiment, a network includes a plurality of nodes interconnected by a plurality of links; and a controller communicatively coupled to one or more of the plurality of nodes, wherein the controller is configured to determine dynamic link weights for links in the network, responsive to a request for a path, for a connection, between a source node and a destination node in the network with a requested bandwidth amount, wherein the dynamic link weights, for each link, are based on a current status of the link and a future status of the link, determine one or more paths for the request based on the dynamic link weights, and select a path of the one or more paths to minimize cost in the network.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, optical and packet path computation and selection systems and methods are described. The systems and methods address the aforementioned problems in on-demand networks, by taking advantage of the fact that path computation and scheduling of connections are performed at a central controller, with the network wide view of the network at the current time, as well as in future times. Path computation in the systems and methods take into consideration known and forecast network status at the time that the connection would be in the network. The path computation also finds a path for a new connection with an acceptable cost to the network to prevent throughput collapse. If the cost of a connection is too high, the connection may be rejected. The systems and methods consider further information in the path computation which may be forecast or exact. Also, the path computation finds eligible paths for a connection. In some cases, multiple paths may be found, if a suitable multi-path shortest algorithm is used.

Exemplary Network

Figure 1:
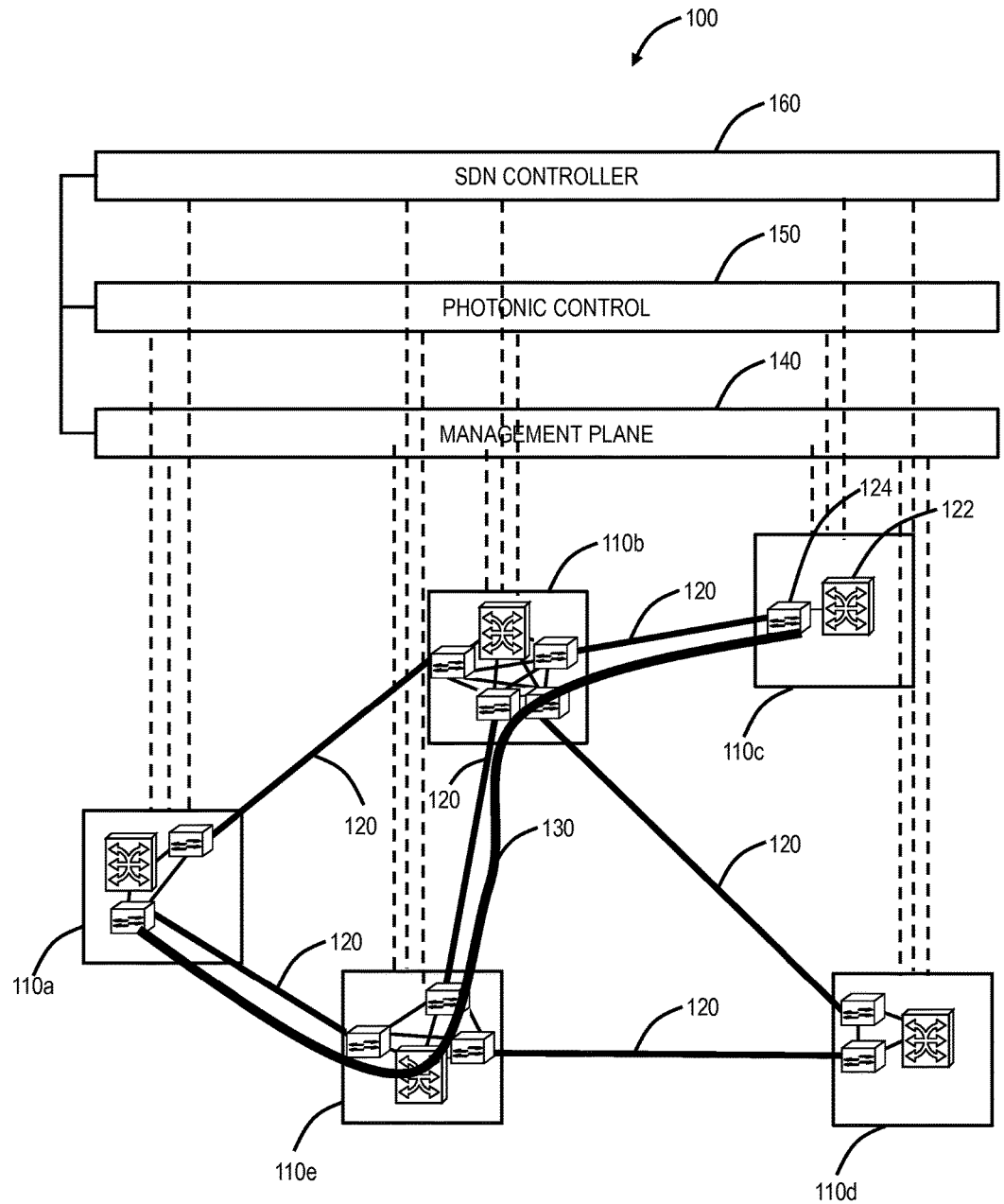
FIG. 1 is a network diagram of an exemplary network with five interconnected sites.

Referring to FIG. 1, in an exemplary embodiment, a network diagram illustrates an exemplary network 100 with five interconnected sites 110a, 110b, 110c, 110d, 110e. The sites 110 are interconnected through a plurality of links 120. Each of the sites 110 can include a switch 122 and one or more WDM network elements 124. The switch 122 is configured to provide services at Layers 1 (e.g., OTN/SONET/SDH) and/or Layer 2 (e.g., Ethernet). The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of ordinary skill in the switch 122 and the WDM network elements 124 may be realized in a same network element. The photonic layer and the photonic control operating thereon can also include intermediate amplifiers and/or regenerators on the links 120 which are omitted for illustration purposes. The network 100 is illustrated, for example, as an interconnected mesh network, and those of ordinary skill in the art will recognize the network 100 can include other architectures, with additional sites 110 or with less nodes sites, with additional network elements and hardware, etc. The network 100 is presented herein as an exemplary embodiment for the implementing the optical and packet path computation and selection systems and methods.

The sites 110 communicate with one another optically over the links 120. The sites 110 can be network elements which include a plurality of ingress and egress ports forming the links 120. Further, the nodes 110 can include various degrees, i.e. the site 110c is a one degree node, the sites 110a, 110d are two degree nodes, the site 110e is a three degree node, and the site 110b is a four degree node. The number of degrees is indicative of the number of adjacent nodes at each particular node. The network 100 is illustrated with a connection 130 between the sites 110a, 110c and through the sites 110b, 110e. The connection 130 can be a subnetwork connection (SNC), label switched path (LSP), or any other end-to-end connection that can utilize the optical and packet path computation and selection systems and methods. Further, the connection 130 can include various different aspects such as a wavelength, TDM traffic, packet traffic, and a combination therein.

The foregoing descriptions focus on L0/L1 aspects of the network 100. Additionally, the network 100 can include other components forming L2 and/or L3 connections in the network 100 such as routers, switches, packet-optical transport systems, and the like. That is, the network 100 can include Ethernet, Virtual Local Area Network (VLAN), Multilayer Protocol Switching (MPLS), Internet Protocol, etc. connections as well. In an exemplary embodiment, the path computation systems and methods can operate at a single Layer (L0, L1, L2, or L3), and in another exemplary embodiment, the path computation systems and methods can operate simultaneously at multiple layers.

The network 100 can include a management plane 140 operating on and/or between the switches 122 at the sites 110a, 110b, 110c, 110d, 110e. The management plane 140 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an exemplary embodiment, the management plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the network 100 and the management plane 140 can utilize any type control plane for controlling the switches 122 and establishing connections therebetween.

A path (e.g., SNC, LSP, etc.) is considered valid for connection setup based on the availability of the switch 122, the links 120, and sufficient bandwidth available thereon, in addition to the various aspects described herein with respect to the optical and packet path computation and selection systems and methods. Photonic networks, i.e. Layer 0 and the wavelength interconnectivity of the WDM network elements 124, introduce additional complexity of successfully setting up a service up. The network 100 can include photonic control 150 which can be viewed as a control plane and/or control algorithm/loop for managing wavelengths from a physical perspective at Layer 0. In one aspect, the photonic control 150 is configured to add/remove wavelengths from the links in a controlled manner to minimize impacts to existing, in-service wavelengths. For example, the photonic control 150 can adjust modem launch powers, optical amplifier gain, variable optical attenuator (VOA) settings, wavelength selective switch (WSS) parameters, etc.

The network 100 can also include a Software Defined Networking (SDN) controller 160. In an exemplary embodiment, the SDN controller 160 and the management plane 140 can work together. In another exemplary embodiment, the SDN controller 160 can operate independently with or without the management plane 140. In a further exemplary embodiment, the SDN controller 160 may be omitted. SDN allows management of network services through abstraction of lower level functionality. This is done by decoupling the system that makes decisions about where traffic is sent (SDN control through the SDN controller 160) from the underlying systems that forward traffic to the selected destination (i.e., the physical equipment in the network 100). Work on SDN calls for the ability to centrally program provisioning of forwarding on the network 100 in order for more flexible and precise control over network resources to support new services. The SDN controller 160 is a processing device that has a global view of the network 100. Additionally, the SDN controller 160 can include or connect to SDN applications which can utilize the data from the SDN controller 160 for various purposes. In an exemplary embodiment, the SDN applications include optical and packet path computation and selection systems and methods which are described in detail herein.

Path Computation Process

Figure 2:
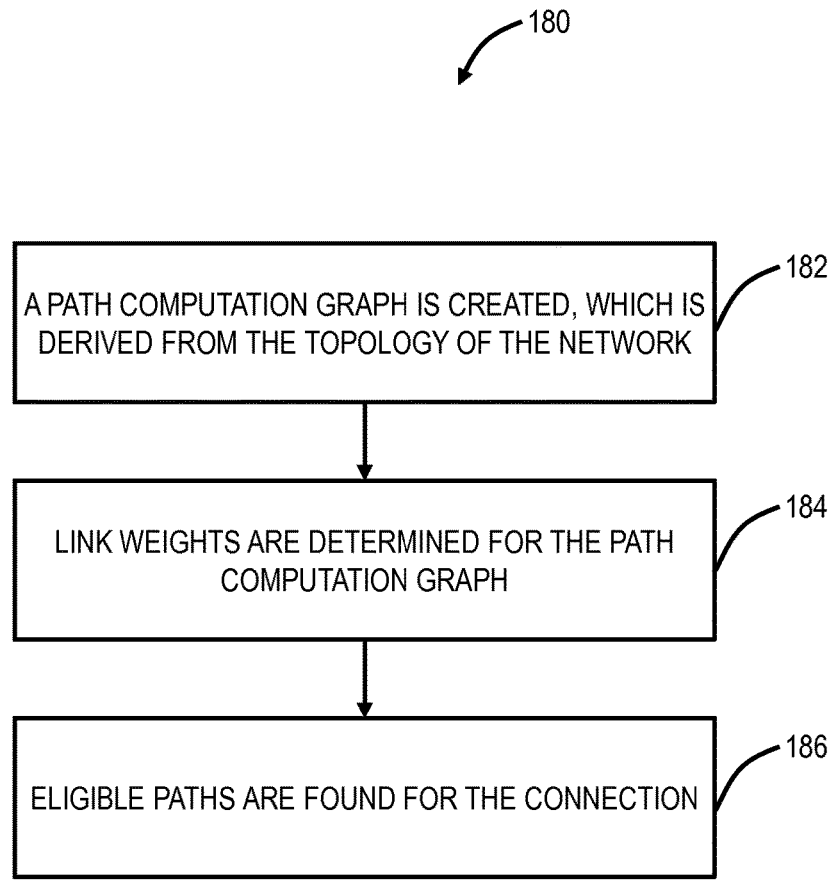
FIG. 2 is a flow chart of a path computation process.

Referring to FIG. 2, in an exemplary embodiment, a flow chart illustrates a path computation process 180. Overall, the path computation process 180 works in three general stages or steps. In a first stage, a path computation graph is created, which is derived from the topology of the network (step 182). The path computation graph takes into consideration multiple-layers which may be used to assign the resources to a connection (wavelengths, OTN containers, etc.). For example, the graph may contain links which are in the topology, as well as link to represent logical operations in the topology (transition from optical to electrical domain). The cost of the links in the computation graph reflects administrative weight input by the user, as well as the costs which reflect the usage of the technology in the underlying layer of the topology.

In a second stage, link weights are determined for the path computation graph (step 184). The link weights are determined from a combination of static link weights, which were input to the path computation process 180, and the network status at the time that the connection would be in the network. Since the connection may be scheduled at a future time, it is necessary for this step to consider the future utilization of the links, which may be determined from known future demand, forecast demand, and known and future network upgrades. Given the utilization, the static link weights are modified with a penalty, which reflects the utilization on each link. The path computation process 180 can include two such penalty mechanisms as described herein. Also, this stage may include link pruning over all points in time that the connection may be in the network to remove the links with insufficient known or predicted capacity. Link pruning can be accomplished by setting the weight of links with insufficient capacity to infinity (or some other relatively large number), or by removing links from the path computation graph altogether. Another way to accomplish link pruning is to assign a very large penalty to links with insufficient bandwidth (i.e. infinity penalty).

In a third stage, eligible paths are found for the connection (step 286). In some cases, multiple paths may be found, if a suitable multi-path shortest algorithm is used. Before the connection is accepted, the paths are checked to see if the cost of accepting the connection is acceptable. There are several exemplary embodiments of different costing strategies/rejection criteria described herein. The path computation process 180 is described herein in additional detail. The path computation process 180, for on-demand connections, observes the current network status when finding paths for new connections as well considers the future known network status and future forecast network status. At the same time, the path computation process 180 protects the network in a highly loaded situation, by rejecting connections whose cost would be too high for the network. The path computation process 180 takes into consideration known and forecast network status at the time that the connection would be in the network. The path computation process 180 also finds a path for a new connection with an acceptable cost to the network.

The path computation process 180 works on a network graph, which is derived from the network topology, taking into consideration multiple-layers which may be used to assign the resources to a connection. For the purposes of a shortest path computation, the path computation process 180 determines dynamic link weights for the graph from static link weights and known and predicted status of the links at the time the connection would be accepted in the network. Depending on the shortest-path computation approach, the path computation process 180 may determine that more than one paths may be able to carry the traffic of the connection. Before the connection is accepted, the paths are checked to see if the cost of accepting the connection is acceptable. The connection is only accepted if the cost is acceptable.

Advantageously, the path computation process 180 can be used to find paths across multiple network layers with different technologies (packet, OTN, optical, etc.). The path computation process 180 uses both the current status and future status of the network to protect the network resources for future connections with global congestion control and connection rejection. The path computation process 180 is optimized to support on-demand network services to take network service providers in a direction to attract new customers and increase revenue. The path computation process 180 contemplates on-demand services through real-time provisioning of on-demand services by a centralized control plane (e.g., an SDN control plane). For example, the path computation process 180 can be used to set up a connection, on-demand, between two enterprise client sites, e.g. a point-to-point Virtual Private Network (VPN) connection or a virtual network between multiple client sites (e.g., data centers, many-to-many business connections, etc.).

The on-demand services may require immediate, deferred or periodic bandwidth. The immediate bandwidth may be required for connections that have real-time requirements (e.g., direct business to business connection—banks, etc.). The deferred bandwidth may be for connections that know their future demands (e.g., live television events, planned network migration, etc.). The periodic bandwidth may be for connections that have a periodic bandwidth pattern (e.g., back-up between data centers, daily mobile cellular traffic, etc.). The on-demand business model requires specialized control plane entities to provide real-time operation, including the path computation process 180 described herein.

Control Plane Overview

Figure 3:
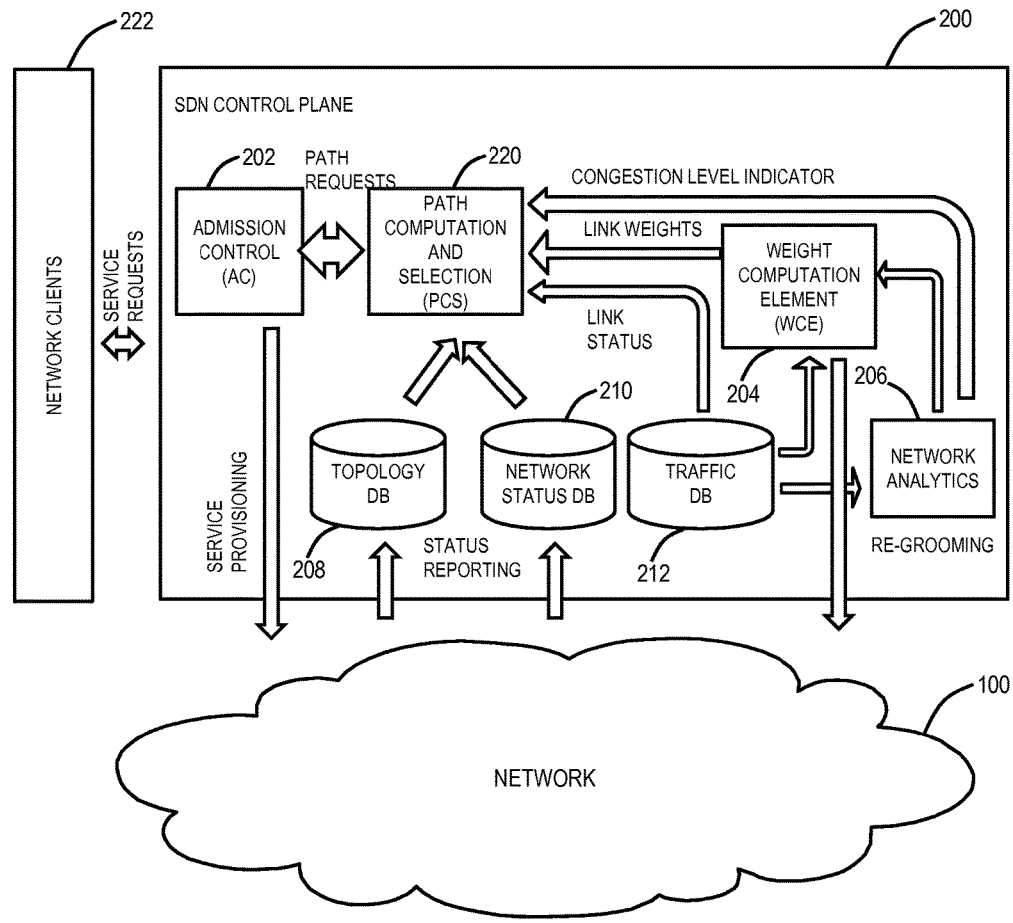
FIG. 3 is a logical diagram of functionality associated with an SDN control plane for implementing the path computation process of FIG. 2.

Referring to FIG. 3, in an exemplary embodiment, a logical diagram illustrates the functionality associated with an SDN control plane 200 for implementing the path computation process 180. In operation, the SDN control plane 200 is communicatively coupled with the network 100. Note, the SDN control plane 200 can be realized in the SDN controller 160 or the like. The SDN control plane 200 enables on-demand services with real-time negotiation of Service Layer Agreements (SLAs). The SDN control plane 200 is an ecosystem of logical components, which work together to provide on-demand network connectivity and network resource management, such as through the path computation process 180. Note, the various logical components in FIG. 3 can be implemented together or separately, in one or more applications associated with the SDN controller 160. It is an objective of the SDN control plane 200 to provide path computation services to other parts of the control plane and the network 100.

The SDN control plane 200 can include an Admission control (AC) module 202, a Weight computation element (WCE) module 204, a Network Analytics (NA) module 206, a topology database (DB) 208, a network status DB 210, a traffic DB 212, and a Path computation and selection (PCS) module 220. The Admission control (AC) module 202 is an optional module which determines if an on-demand connection/network should be accepted or not. The AC module 202 negotiates with outside entities, such as network clients 222, on the behalf of the SDN controller 160. The AC module 202 may use knowledge of existing and future connections/networks to determine pricing (link weights). The AC module 202 may take network status into consideration to determine pricing (link weights). The AC module 202 may determine if a connection is rejected, or let the PCS module 220 determine if a connection is rejected. The AC module 202 may call the PCS module 220 multiple times if the network 100 has multiple sources/destinations. The AC module 202 may call the PCS module 220, or if the connection has flexibility in its bandwidth demand and it is rejected (i.e. each call would have a decreased bandwidth demand).

The Weight computation element (WCE) module 204 is an optional module which determines the link weights in the network 100. The link weights are determined based on the knowledge of current end-to-end traffic in the network. In the absence of the WCE module 204, link weights may be set to 1 to reflect shortest path criterion or to a physical distance of the link to reflect shortest distance criterion. In the absence of the WCE module 204, link weights may be set to physical layer latency to reflect minimum latency criterion. The Network Analytics (NA) module 206 is configured to analyze the current information about the network 100 (i.e. allocated bandwidths, traffic patterns, connection behavior) and produce information to be used elsewhere (i.e. to calculate future link bandwidth usage). The NA module 206 can produce a demand matrix, which may be used by WCE module 204 to determine static link weights. The NA module 206 can measure the level of congestion in the network 100 and provide the PCS 220 with information to adjust routing parameters.

The topology DB 208 can contain information about link properties: connections between elements, maximum rate between elements, etc. as well as information about logical links (links that span multiple hops, available OTN containers, packet bandwidth, etc.). Note, links generally can be considered both a physical link and a logical link. The physical link is the actual fiber with its associated properties for supporting optical connections, whereas the logical link is the actual connection, such as a wavelength, OTN container, packet stream, etc.). The topology DB 208 can contain information about physical links (information about optical spectrum allocation, availability of OTN containers and their type, shared risk link groups, etc.) as well. The network status DB 210 can contain information about allocated capacities on the links. The network status DB 210 can also keep track of capacities over time in the case calendaring of connections is used (i.e. start and end times for allocated capacities). The traffic DB can contain information about admitted and rejected end-to-end connections, and may be used for billing, estimation of demand matrices and forecasting of demand. The path computation element (PCS) module 220 interacts with the rest of the components in the SDN control plane 200 and is the topic of the remainder of the following description.

Path Computation Element (PCS) Module

The PCS module 220 is a logical element which may reside in multiple locations in the SDN control plane 200. For example, the PCS module 220 may be a library with static linkage to other components in the SDN control plane 200; a standalone application in the SDN controller 160, which may provide an interface to other applications; a standalone application outside of the SDN controller 160, e.g. using the controller's northbound interface; or the like. Also, the PCS module 220 may be implemented as a virtual network appliance (Network Functions Virtualization (NFV)) providing services to other virtual network appliances in the control plane using Remote Procedure Call (RPC) or a network protocol for communications, a standalone network element providing services to other network elements or SDN controller applications using RPC or a network protocol for communications, or the like. Finally, the PCS module 220 may be implemented on one or more servers or a hardware element containing special purpose hardware (e.g. Graphical Processing Unit—GPU).

Figure 4:
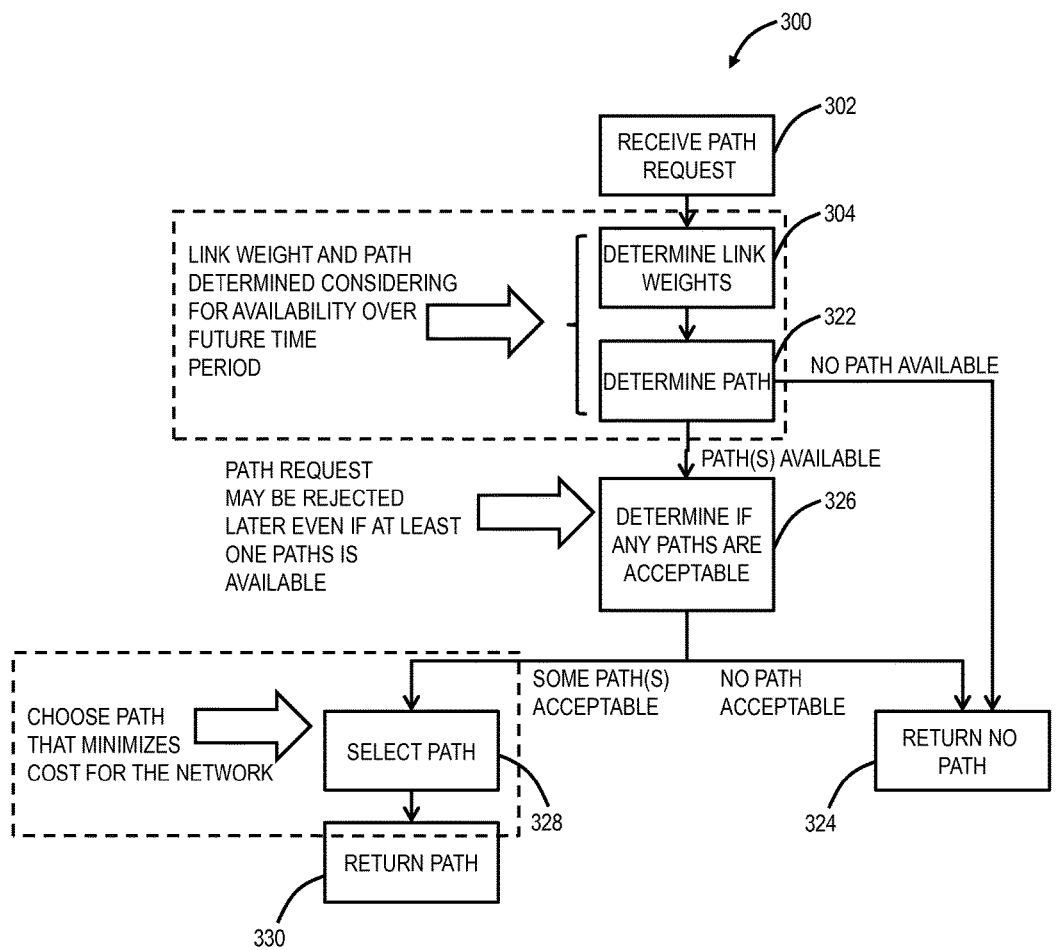
FIG. 4 is a flow chart of a Path Computation and Selection (PCS) process, which can be implemented by a PCS module in the SDN control plane of FIG. 3.

Referring to FIG. 4, in an exemplary embodiment, a flow chart illustrates a PCS process 300, which can be implemented by the PCS module 220. The PCS process 300 includes receiving a path request (step 302). The simplest path requests can include source-destination pair (A-Z nodes) and the required bandwidth. Other Quality of Service (QoS) characteristics may also be included (e.g. maximum latency, maximum number of hops). Protection characteristics may be included (e.g. shared or dedicated protection, diversity) along with a preferred geography/topology (subset of preferred links/paths, etc.).

The path requests may also include the schedule of when the bandwidth is required, e.g., latest starting time of connection, duration of connection, etc. The path requests may include a via point, including hair-pin connections which can be easily translated into a two connecting connections. The path request may include a set of sources and a set of destinations with bandwidth specified between each pair separately, or as sum of the bandwidths between groups of source-destination pairs. These requests can also be decomposed into separate path computation requests using network flow programming. Decomposition of the requests into simple path request may be performed inside the PCS module 220 or by an outside entity (e.g. the AC module 202).

Next, the PCS process 300 includes determining link weights (step 304). Static link weights are given as an input to the PCS module 220 and the PCS process 300. These link weights may be input manually, determined by the WCE module 204 based on traffic engineering optimization, and for logical connections and/or physical connections. The PCS process 300 modifies the static link weights to use for path calculation. The weights may be modified to reflect the costs of technologies from multiple-layers in the network, to reflect the current availability of bandwidth in the network, to reflect the future availability of bandwidth in the network, etc. The PCS process 300 can first adjust the static link weights with static information and then adjusts the link weights with dynamic information. Examples of static weight adjustments include multi-layer static link weight adjustment and the like. Examples of dynamic weight adjustments include an available bandwidth link weight adjustment, link weight adjustment for network-wide congestion control and avoidance, and the like.

With respect to multi-layer static link weight adjustment, a logical link may correspond to multiple physical links in the underlying network. For example, a logical link may correspond to multiple physical links provided by OTN containers available across the link, multiple fibers between two network elements may be represented by a single logical link, two logical links may correspond to two different technologies (e.g. Optical channel Data Unit (ODU) container and Optical channel Transport Unit (OTU) container), etc. ODU containers support electrical channels, i.e. Time Division Multiplexing (TDM), packet, etc., whereas OTU containers support wavelengths (DWDM). For example, The PCS process 300 may adjust static weights to make them better suited to the underlying technology. For example, assume that a logical link is given a weight w and that the link may have multiple available Optical channel Data Unit (ODU) containers. The ODU containers may be given weights $w+\alpha$, $w+2\alpha$, $w+3\alpha$, etc. to prevent ODU container fragmentation. Links weights corresponding to links of different technologies may be adjusted to correspond to their respective cost. For example OTU containers (DWDM channels) may have their weights decreased, while ODU container (requiring electrical processing) may have their weights increased.

With respect to the available bandwidth link weight adjustment, given the bandwidth demand B, set the link weights to infinity if B is greater than available bandwidth on the link for all time periods requested by the connection. Setting the infinite weight is equivalent to link pruning. The available bandwidth may be known from currently committed bandwidth and current capacity in the network. The available bandwidth may be a weighted sum of currently committed bandwidth in the network and an estimate of future bandwidth requests and current capacity in the network. The available bandwidth may be a weighted sum of currently committed bandwidth in the network and an estimate of future bandwidth requests and current capacity in the network and known or estimated future capacity in the network. The available bandwidth may be a weighted sum of a future committed bandwidth and an estimate of future bandwidth or known future allocation. The available bandwidth may be known from current bandwidth allocation in the network and the part of bandwidth reserved for important connections. The available bandwidth may be known from current bandwidth allocation in the network and the part of bandwidth reserved for congestion control during the times of congestion.

Figure 5:
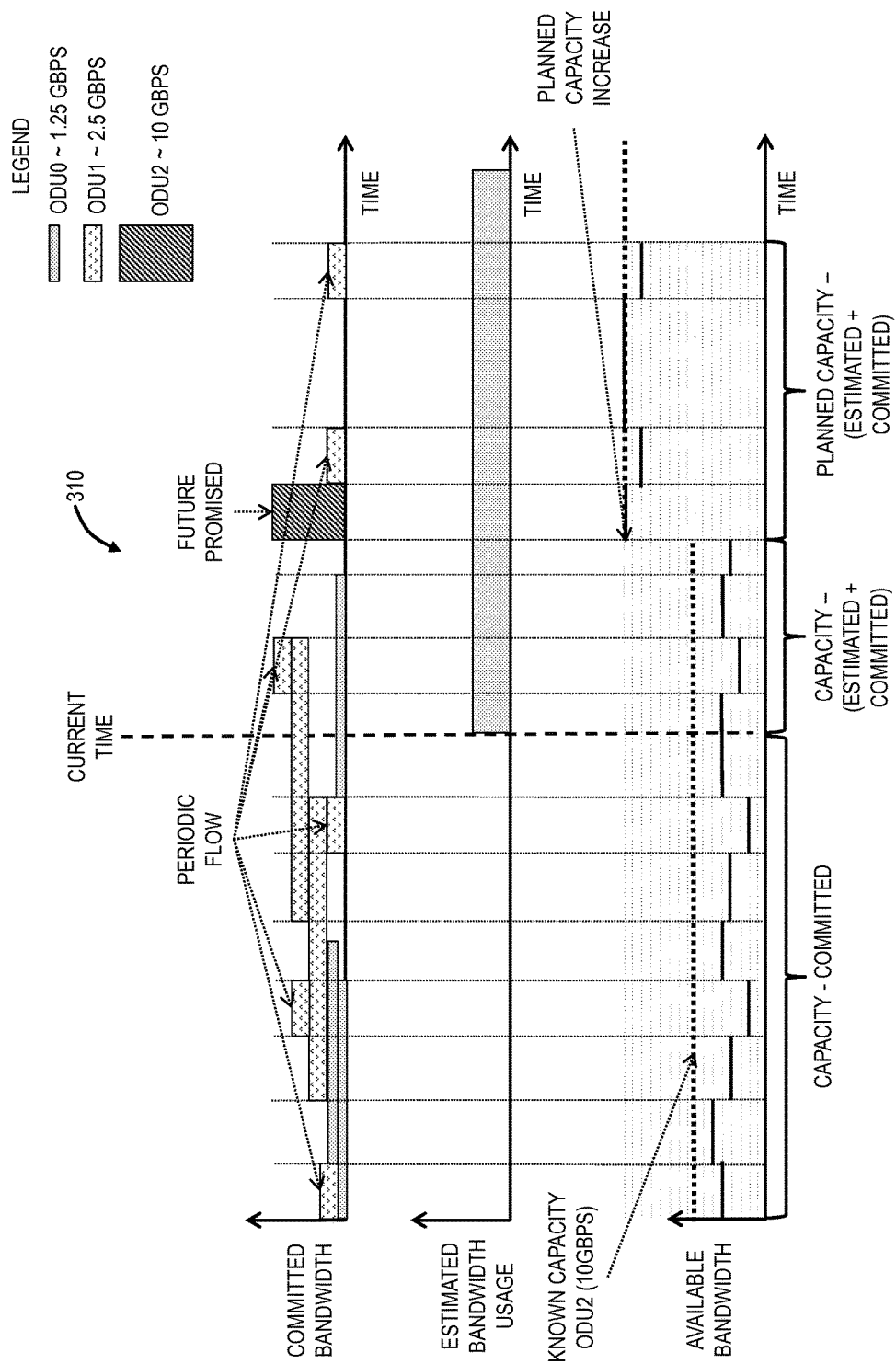
FIG. 5 is a graph of exemplary link bandwidth over time for illustration of the available bandwidth link weight adjustment for a link in the PCS process of FIG. 4.

Referring to FIG. 5, in an exemplary embodiment, a graph illustrates exemplary link bandwidth 310 over time for illustration of the available bandwidth link weight adjustment for a link. The graph includes three graphs—committed bandwidth, estimated bandwidth usage, and available bandwidth, and is shown with a current time with times before the current time having occurred and time after the current time as future expectations. The committed bandwidth shows bandwidth provisioned currently and in the past as well as future provisioned bandwidth. From the committed bandwidth, in the past, the estimated bandwidth usage can be derived for the future, such as based on analysis of previous behaviors. The available bandwidth link weight adjustment can provide adjustments to the link weight based on the available bandwidth graph which can take into account the estimated bandwidth usage plus any future promised bandwidth for the committed bandwidth.

Figure 6:
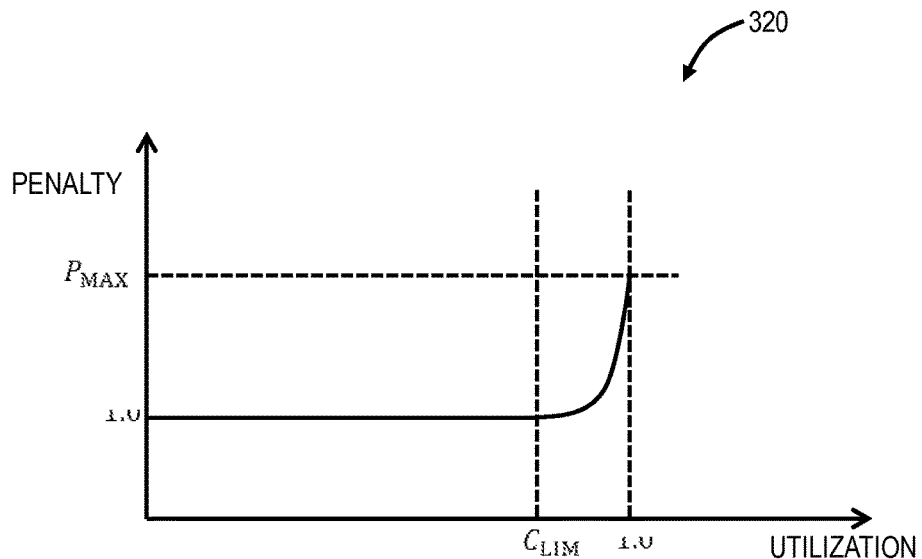
FIG. 6 is a graph and computation of link weight adjustment for congestion control for a link in the PCS process of FIG. 4.

Referring to FIG. 6, in an exemplary embodiment, a graph and computation illustrate link weight adjustment 320 for congestion control for a link. The link weight may be adjusted by adding a penalty function through a multiplication. The effect of the penalty function is to discourage the path computation algorithm from using links, which are currently busy or are expected to be busy in the future. This accomplishes the goal of network-wide congestion control. The penalty function may have as an input current network status, predicted network status, existing network connections, predicted network connections, committed future bandwidth, current network capacity, and future network capacity. A combination of these values may be used to determine a representative link utilization to use for dynamic link weights (e.g. weighted sum). Given a static weight $w_s$, the dynamic weight is calculated with $w_d = P * w_s$. For example, a penalty function, for a link, can include:

$$P(u) = \frac{1}{u}, u > 0$$

where u is the utilization, obtained from the weighted sum corresponding to available bandwidth. FIG. 6 illustrates another penalty function that only penalizes a link if the utilization is above a give threshold, $C_{lim}$. Here, the penalty is parameterized with $C_{lim}$. Here, the graph for the link weight adjustment 320 illustrates this penalty function with $C_{lim}$. There is no penalty, P=1, until $C_{lim}$ is reached, and then the penalty is up to $P_{max}$ as shown by the graph and computation.

Referring back to FIG. 4, the PCS process 300 includes determining paths (step 322). With the adjusted link weights from the step 304, the paths can be calculated using standard graph path computation algorithms. For example, the network is first represented as a graph data structure (arcs in the graph be directed or undirected) link weights in the network become arc weights in the graph. A dictionary mapping network links to graph arcs may be used. Links with multiple layers may be represented as multiple arcs in the graph. If it is possible to switch layers between links of different technologies, a graph vertex is added to connect the arcs from separate layers. Depending on network policy the vertex may also be assigned a cost (to discourage hoping between layers), in which case the vertex is replaced with two vertices and the arc with the corresponding weight. Any minimum path algorithm may be used to find the path on the graph structure. For example, Dijkstra's algorithm may be used if the weights are positive. Other algorithms are also contemplated, such as the Bellman-Ford algorithm (which may be implemented in a parallel manner), Edge-disjoint Dijkstra's algorithm to find restoration paths, K-shortest path algorithm to retrieve k paths of increasing length, and the like. If link weights were not adjusted for available bandwidth, algorithms may be modified to include bandwidth requirements. The actual path is recovered by remapping arcs in the graph structure to the links in the network (e.g. using the dictionary).

If no paths are available after the step 322, the PCS process 300 ends and returns no path (step 324). If there are paths available after the step 322, the PCS process 300 determines if any of the paths are acceptable (step 326). If there are no acceptable paths, the PCS process 300 ends and returns no path (step 324). An unacceptable path may be one that is available, i.e. chosen in the step 322, but unacceptable due to constraints such as costs, future bandwidth requirements, etc. If there are one or more paths available after the step 326, the PCS process 328 selects a path based on costs, i.e. the chosen path is selected to minimize network cost. If there is only one acceptable path from the step 326, this path is chosen. If there are multiple acceptable paths from the step 326, the PCS process 328 performs a cost comparison.

The PCS process 300 may be able to find a multiple paths satisfying the bandwidth demands, in which case it is necessary to select one of the paths for future consideration. Generally speaking, the PCS process 300 should select the path that will minimize future blocking in the network. In highly loaded situations, the PCS process 300 may reject the connection to prevent future blocking in the network and prevent throughput collapse in the network. The path may be selected based on a cost function for the path. The cost function is chosen so that if a connection is accepted in the network, that action would not cause a future connection from blocking. The cost function may be based on the total number of hops in the path. For example, if the path exceeds the shortest-hop path plus a constant, its cost may be set to infinity. The cost of the path may be based on the remaining bandwidth if the connection is accepted (least remaining bandwidth among the links on the path, or the sum of remaining bandwidths on all links in the path, or a minimum threshold on available path bandwidth). The cost function may be based on the availability of a restoration path. If an appropriate restoration path is not available the cost can be set to infinity.

The cost of the path may be calculated to minimize "interference" to future connections, by first finding, for each link, all vertex pairs for which this link is in their max-min cut, finding a weighted sum of the max-min cut bandwidths and using this number as the cost of using the link. Paths for which the cost function is higher than a given threshold are rejected, while the path returned is the path with the minimum cost among all acceptable paths. To disable rejection, the threshold can be set to infinity. If restoration paths are calculated during path computation, the cost function may be the sum of the costs of the main and the restoration path. The path selection and rejection may be parameterized (e.g. cost threshold, bandwidth reservation level, maximum number of hops, etc.). Path selection and rejection may automatically adjust parameters to keep the blocking probability constant (additive increase/decrease with rejections). Path selection and rejection may directly adjust parameters given the congestion level information from the network analytics module (e.g. table lookup of congestion level→parameter value). With all of the costs determined, the PCS process 300 returns the path with the minimum network cost (step 330).

In an exemplary embodiment, the optical and packet path computation and selection systems and methods determine the path to be used by a scheduled end-to-end flow using the knowledge of at least one of the following: requested bandwidth, desired time of use, current network status, predicted network status, existing network connections, committed future bandwidth, predicted network connections, current network capacity, and future network capacity. Dynamic link weights are determined based at least one of the current network status, predicted network status, known future network status, planned future capacity, known future capacity. The systems and methods can determine least-cost paths, selects one of the least-cost paths, calculates the cost of the selected path, and accept or reject the path based on connection's criteria, where there may be multiple technology layers or a single technology layer in the network. For the dynamic link weights, links without sufficient current or future bandwidth are given a link weight of infinity (or some extremely high value). The dynamic link weights are determined based on current network status, determined from static link weights by adding a penalty term which is determined by current bandwidth allocated on the link. The cost of the selected path is determined based on the shortest path for the connection, and, if the length the selected path is longer than the prescribed threshold, the cost of the selected path is set to infinity (or some extremely high value).

After finding a path, the systems and methods determine whether or not to accept the path to protect the network from throughput collapse in highly congested situations, by determining the cost of the path to the network, where the path may be rejected based on the cost of the path to the network if the connection is accepted. The cost can be based on the total length of the path and the rejection criteria is the total length of the path exceeding a prescribed threshold for the connection or the network. The cost can be based on the remaining bandwidth on the path, and the rejection criteria is the total length of the path exceeding a prescribed threshold for the connection or the network. The cost can be based on the minimum of maximum throughput of all flow pairs in the network, where the rejection criteria are the minimum throughput being below a prescribed threshold for the connection or the network.

In an exemplary embodiment, the optical and packet path computation and selection systems and methods determine the path to be used by a scheduled end-to-end flow using the knowledge of at least one of the following: requested bandwidth, desired time of use, current network status, predicted network status, existing network connections, committed future bandwidth, predicted network connections, current network capacity, and future network capacity. Dynamic link weights are determined based on the current network status and at least one of predicted network status, known future network status, planned future capacity, known future capacity. The systems and methods can determine least-cost paths, selects one of the least-cost paths, calculates the cost of the selected path, and accept or reject the path based on connection's criteria, where there may be multiple technology layers or a single technology layer in the network. For the dynamic link weights, links without sufficient current or future bandwidth are given a link weight of infinity (or some extremely high value). The dynamic link weights are determined based on current network status, determined from static link weights by adding a penalty term which is determined by current bandwidth allocated on the link. The cost of the selected path is determined based on the shortest path for the connection, and, if the length the selected path is longer than the prescribed threshold, the cost of the selected path is set to infinity (or some extremely high value).

After finding a path, the systems and methods determine whether or not to accept the path to protect the network from throughput collapse in highly congested situations, by determining the cost of the path to the network, where the path may be rejected based on the cost of the path to the network if the connection is accepted. The cost can be based on the total length of the path and the rejection criteria is the total length of the path exceeding a prescribed threshold for the connection or the network. The cost can be based on the remaining bandwidth on the path, and the rejection criteria is the total length of the path exceeding a prescribed threshold for the connection or the network. The cost can be based on the minimum of maximum throughput of all flow pairs in the network, where the rejection criteria are the minimum throughput being below a prescribed threshold for the connection or the network.

Link Pruning in Time and Available Capacity Calculation

Figure 7:
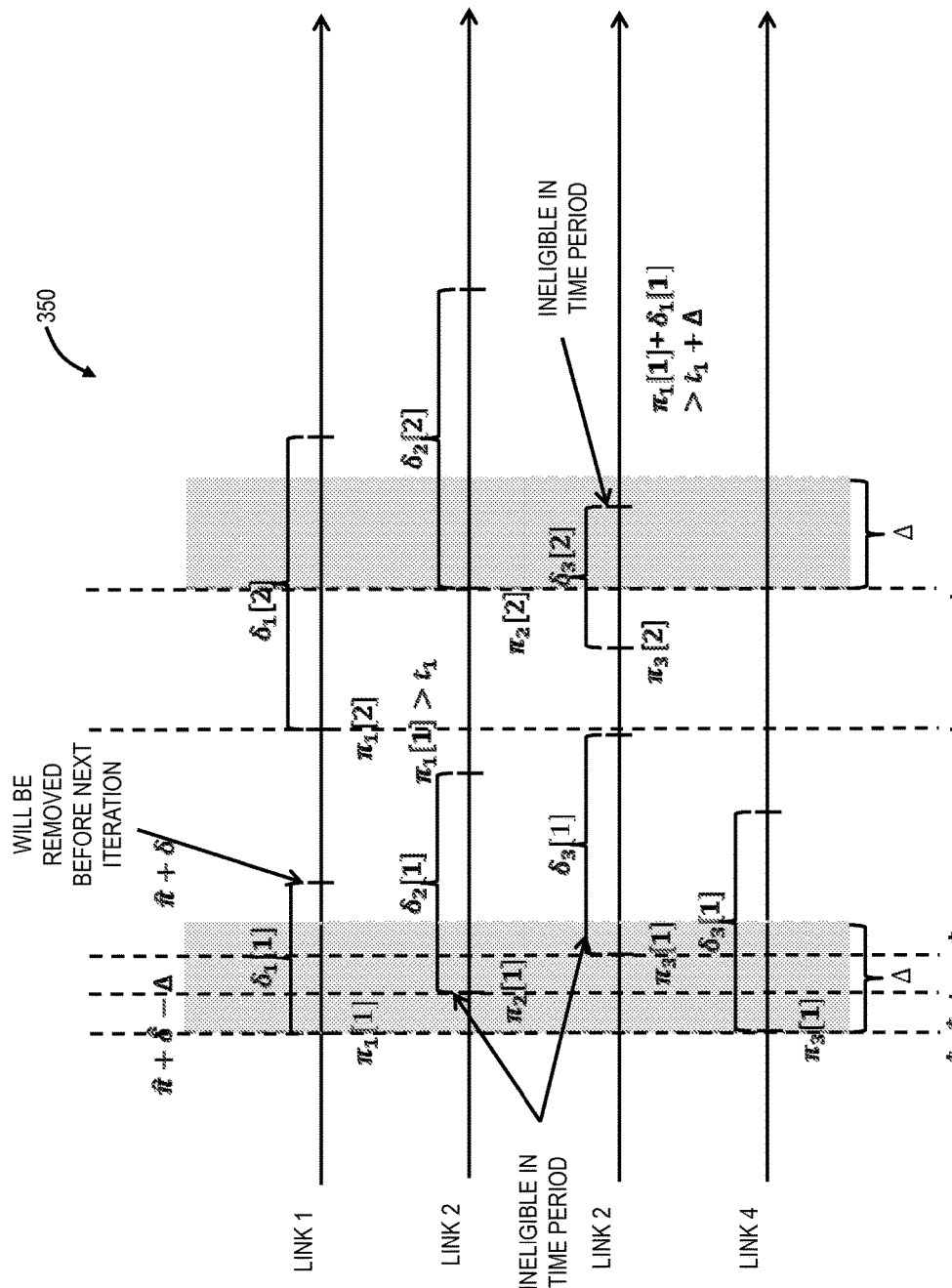
FIG. 7 is a graph of link pruning.

Referring to FIG. 7, in an exemplary embodiment, a graph illustrates link pruning 350. Link pruning may be run to eliminate the links, from the PCS process 300 with insufficient capacity at the time when that capacity is needed. Since connections may be scheduled with slack, and possibly in the future, it is necessary to find links with sufficient bandwidth over the time period requested by the connection, when implementing the PCS process 300. Link availability in future times may be calculated from known committed bandwidth and predicted bandwidth. Assume that a connection bandwidth request is a 4-tupple $[t_s, t_f, r, \Delta]$ with $t_s$—earliest start time, $t_f$—latest finish time, r—requested rate, and $\Delta$—connection duration.

Link pruning examines every link i and checks for the duration of time during which its available capacity is higher than r bits/s, links without sufficient capacity are pruned, i.e. removed from consideration. For each link i, record the time instances where the capacity is higher than r bits/s: the time when the availability starts, $\pi_i[k] \geq t_s$, k=1, . . . , $n_i$, and duration of availability $\delta_i[k]$. For each link, remove time instances for which $\delta_i[k] < \Delta$ and $t_f - \pi_i[k] < \Delta[k]$. Links where $n_i = 0$ are pruned, the remaining links are candidate links in the PCS process 300.

Candidate links can be further pruned if the capacity is not simultaneously available on the links, by finding time instances where links have sufficient bandwidth (see the link pruning 350 in FIG. 7 for an exemplary illustration). This can be done by scanning available times to find time intervals where sufficient end-to-end bandwidth exists to support the request. The algorithm works on a list of sorted starting times, $\pi_i[k]$, which are denoted with $t_1 < t_2 < \ldots < t_N$, and produces a set of sub-graphs for each time where there is sufficient capacity to connect source and destination. The iteration follows the list of times in sequence. In each iteration, take the next time in the list, $t_j$, create a sub-graph from links i for which $\pi_i[k] \leq t_j$ and $\pi_i[k] + \delta_i[k] \geq t_j + \Delta$, and check if there is a path in the sub-graph for the connection. Find $\Delta_j = \min\{\pi_i[k] + \delta_i[k] - t_j\}$, the longest time during which all links are on at the same time. If there is a path available, save the links into a sub-graph and the start time and go to the next iteration.

After all of the possible sub-graphs are discovered, chose one that is the most beneficial. Find the sub-graph with maximum flow between source and destination, to maximize left-over capacity, and find the sub-graph where adding the flow will minimize variance of link utilizations, to maximize load-balancing. To reduce complexity in link pruning, the iterations could be stopped when the first sub-graph is found, leading to the earliest scheduled time. Alternatively, the iterations could be stopped when the first K sub-graphs are found. Also, K-shortest paths can be used before algorithm start to limit link on the ones that would be good for A-Z flow.

PCS Process with Single-Path Algorithm

Figure 8:
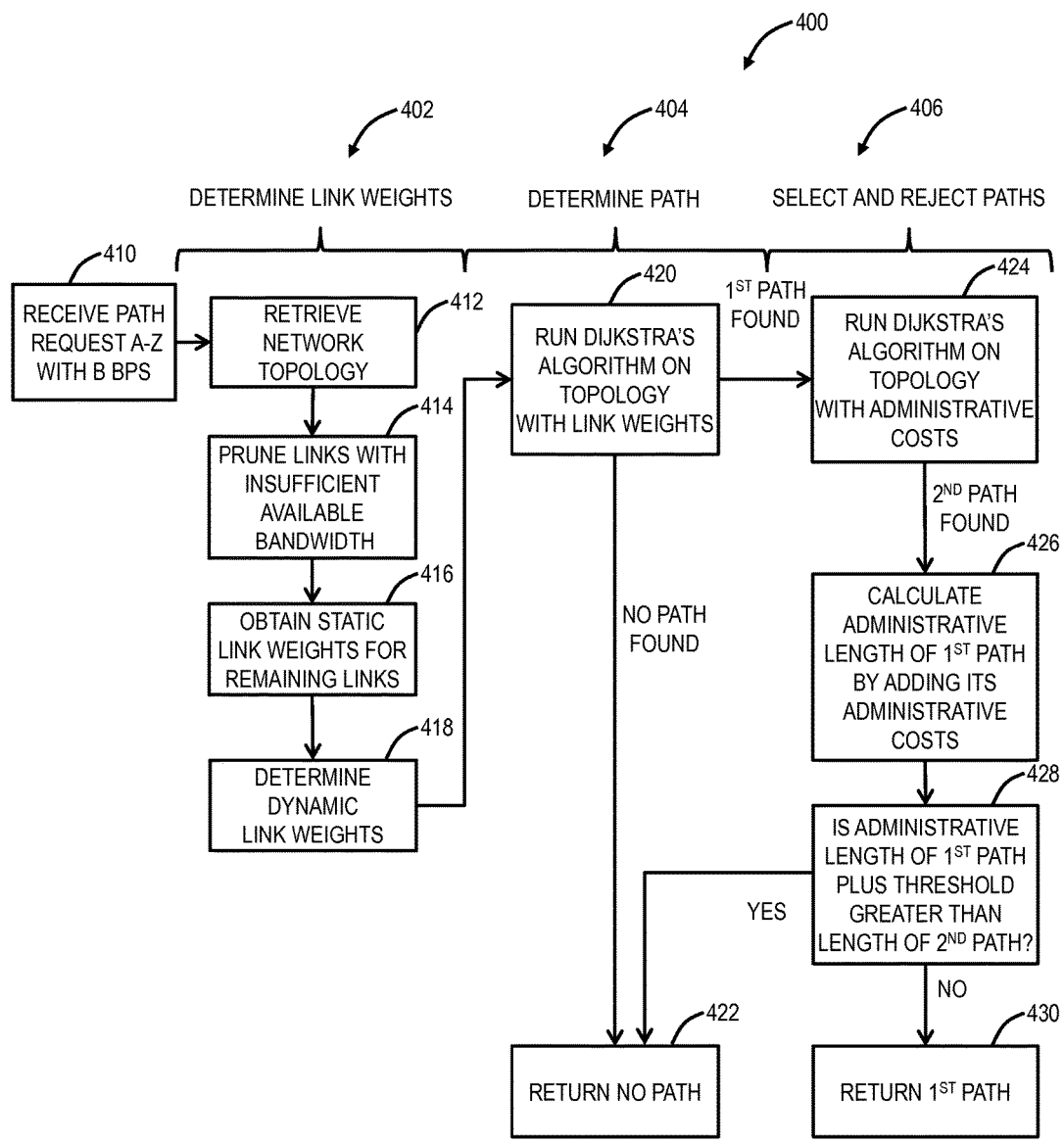
FIG. 8 is a flow chart of an exemplary PCS process with a single-path algorithm.

Referring to FIG. 8, in an exemplary embodiment, a flow chart illustrates an exemplary PCS process 400 with a single-path algorithm. In particular, the PCS process 400 is an example of the PCS process 300 with the single-path algorithm. Note, the various steps in the PCS process 400 can be categorized as steps related to determining link weights (steps 402), determining paths (steps 404), and selecting and rejecting paths (steps 406). The PCS process 400 includes receiving a path request with A-Z nodes (source and destination) with a desired bandwidth (B bps) (step 410). The PCS process 400 then proceeds to the determining link weights steps 402 by retrieving the network topology (step 412), pruning links with insufficient available bandwidth (step 414), obtaining static link weights for the remaining links (step 416), and determining the dynamic link weights (step 418).

The PCS process 400, with the network topology and dynamic link weights, proceeds to the determining paths steps 404 by running Dijkstra's algorithm on the network topology with the dynamic link weights (step 420). If no path is found, the PCS process 400 returns no path (step 422). If a path is found and after finding the first path, the PCS process 400 moves to the selecting and rejecting paths steps 406. This includes running Dijkstra's algorithm on the network topology with the administrative costs (step 424). Here, the administrative costs are based on the aforementioned cost functions versus the dynamic link weights which are based on current and future bandwidth and associated penalties. After a second path is found in the step 424, an administrative length of the first path is determined by adding all associated administrative costs in the first path (step 426), i.e. administrative length is the sum of all administrative costs in a path. The PCS process 400 checks if the administrative length of the first path is greater than that of the second path plus a threshold (step 428). If so, the PCS process 400 ends and returns no path (step 422) because the costs of the first path found, based on the dynamic link weights, are too high. If not, the PCS process 400 returns the first path and ends (step 430).

PCS Process with Bounded Costs

Figure 9:
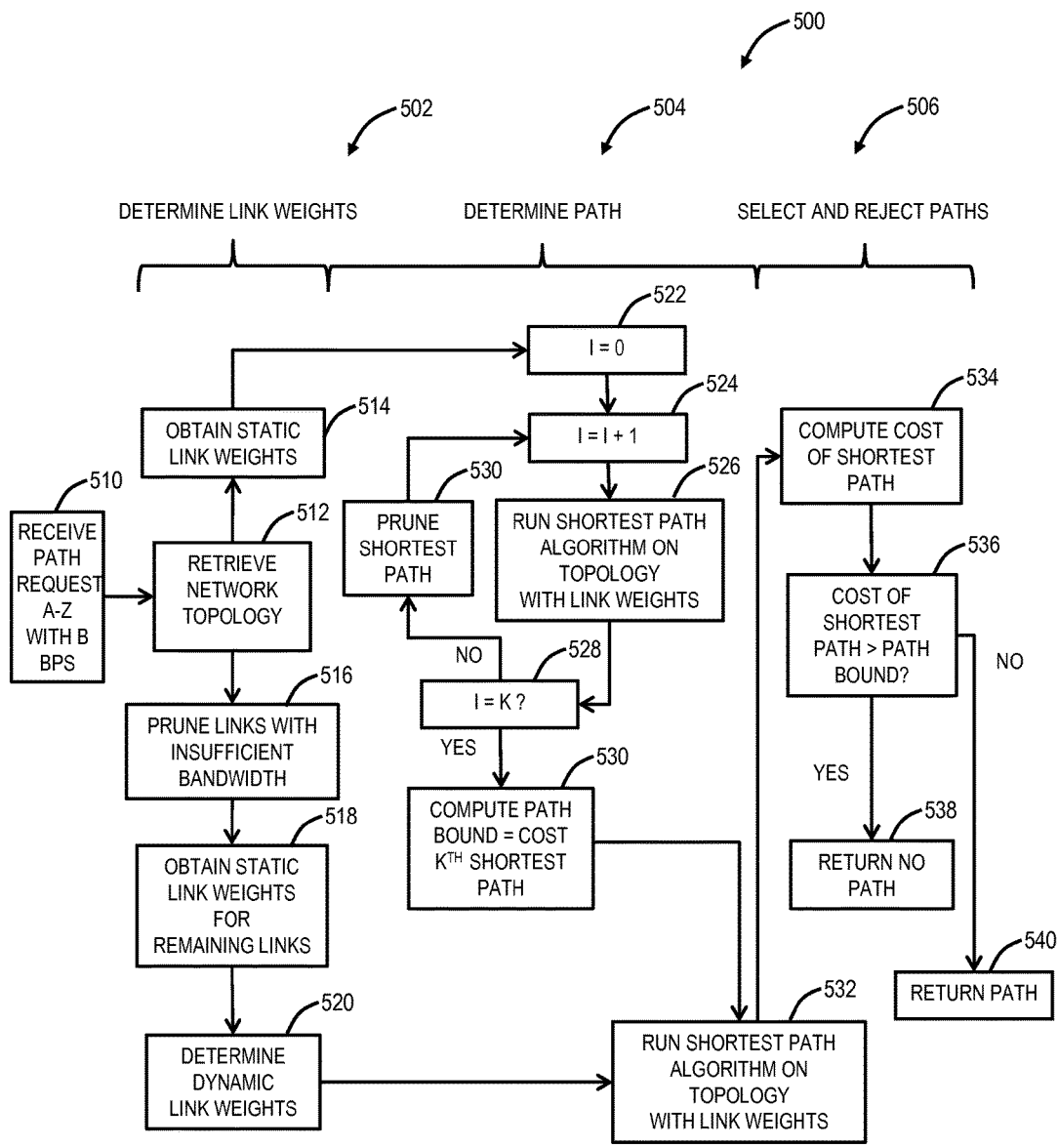
FIG. 9 is a flow chart of an exemplary PCS process with bounded costs.

Referring to FIG. 9, in an exemplary embodiment, a flow chart illustrates an exemplary PCS process 500 with bounded costs. In particular, the PCS process 500 is an example of the PCS process 300 with bounded costs. Note, the various steps in the PCS process 500 can be categorized as steps related to determining link weights (steps 502), determining paths (steps 504), and selecting and rejecting paths (steps 506). The PCS process 500 includes receiving a path request with A-Z nodes (source and destination) with a desired bandwidth (B bps) (step 510). The PCS process 500 then proceeds to the determining link weights steps 502 by retrieving the network topology (step 512). The PCS process 500 obtains the static link weights (step 514) and also prunes links with insufficient bandwidth for the path request (step 516) and obtains static link weights of the remaining links after the pruning (step 518). The PCS process 400 includes determining dynamic link weights (step 520).

Also, after the step 514, the PCS process 500 can perform an iterative process (steps 522-530) to prune shortest paths (penalize) to avoid throughput collapse. The iterative process sets a counter I=0 (step 522) and increments through I (step 524) running a shortest path algorithm on the network topology with the static link weights (step 526). If I does not equal K (step 528), the iterative process can prune the shortest path (step 530) and return to the step 524; else, the iterative process can compute a path bound equal to the cost of the $K^{th}$ shortest path (step 530). Subsequent to the steps 520, 530, the PCS process 500 runs the shortest path algorithm on the network topology with the dynamic link weights (step 532), and computes the cost of the shortest path (step 534). If the cost of the shortest path is greater than the path bound (step 536), the PCS process 500 ends and returns no path (step 538). Otherwise, the PCS process 500 returns the shortest path from the step 534 (step 540).

PCS Process with Bandwidth Reservation

Figure 10:
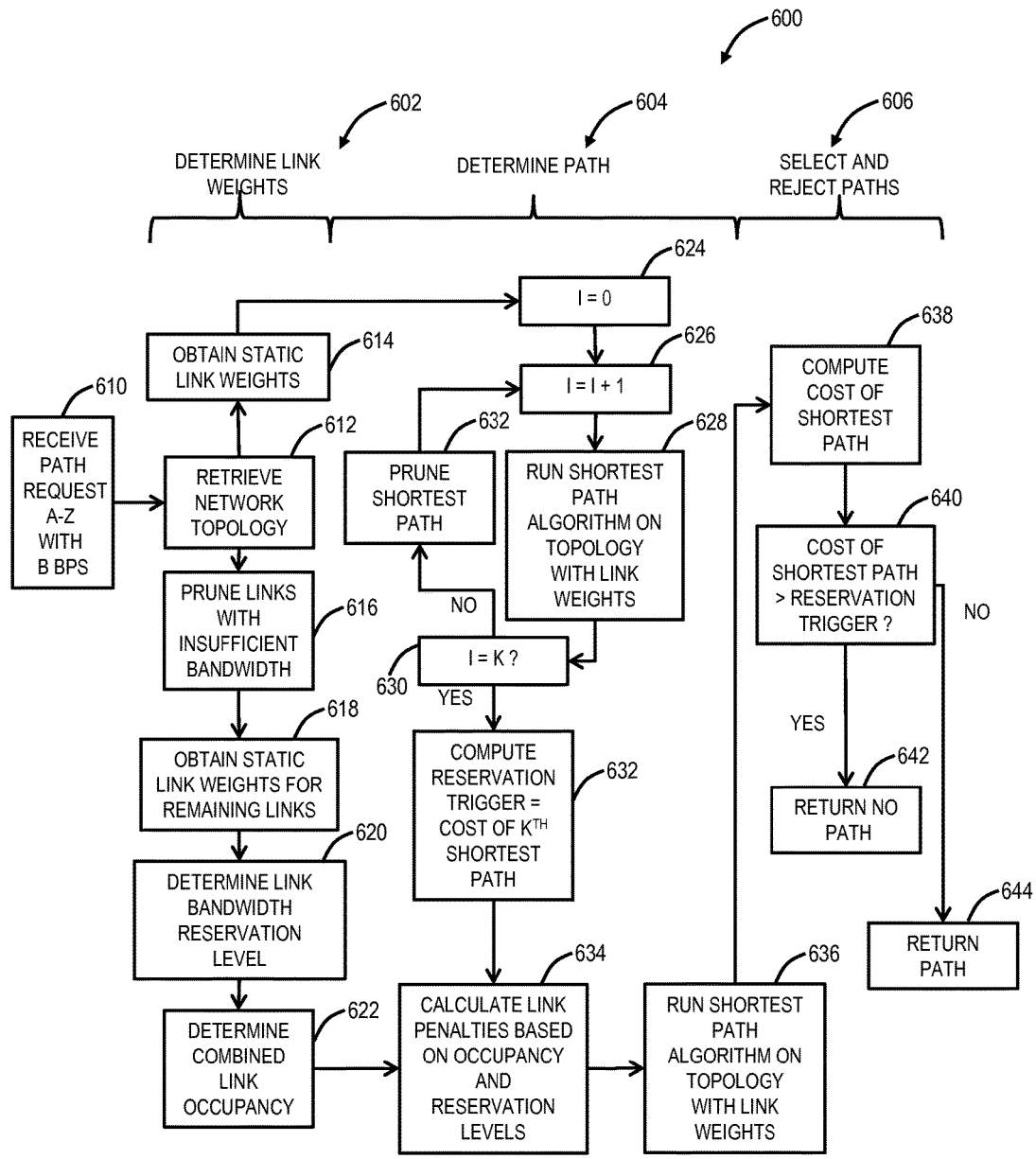
FIG. 10 is a flow chart of an exemplary PCS process with bandwidth reservation.

Referring to FIG. 10, in an exemplary embodiment, a flow chart illustrates an exemplary PCS process 600 with bandwidth reservation. In particular, the PCS process 600 is an example of the PCS process 300 with bandwidth reservation. Note, the various steps in the PCS process 600 can be categorized as steps related to determining link weights (steps 602), determining paths (steps 604), and selecting and rejecting paths (steps 606). The PCS process 600 includes receiving a path request with A-Z nodes (source and destination) with a desired bandwidth (B bps) (step 610). The PCS process 600 then proceeds to the determining link weights steps 602 by retrieving the network topology (step 612). The PCS process 600 obtains the static link weights (step 614) and also prunes links with insufficient bandwidth for the path request (step 616) and obtains static link weights of the remaining links after the pruning (step 618). The PCS process 400 includes determining link bandwidth reservation level (step 620) and combined link occupancy (step 622).

Also, after the step 614, the PCS process 600 can perform an iterative process (steps 624-634) to prune shortest paths (penalize) to avoid throughput collapse. The iterative process sets a counter I=0 (step 624) and increments through I (step 626) running a shortest path algorithm on the network topology with the static link weights (step 628). If I does not equal K (step 630), the iterative process can prune the shortest path (step 632) and return to the step 626; else, the iterative process can compute a reservation trigger equal to the cost of the $K^{th}$ shortest path (step 632). Subsequent to the steps 622, 634, the PCS process 600 runs the shortest path algorithm on the network topology with the dynamic link weights (step 636), and computes the cost of the shortest path (step 638). If the cost of the shortest path is greater than the reservation trigger (step 64), the PCS process 600 ends and returns no path (step 642). Otherwise, the PCS process 600 returns the shortest path from the step 638 (step 644).

Exemplary Network Element

Figure 11:
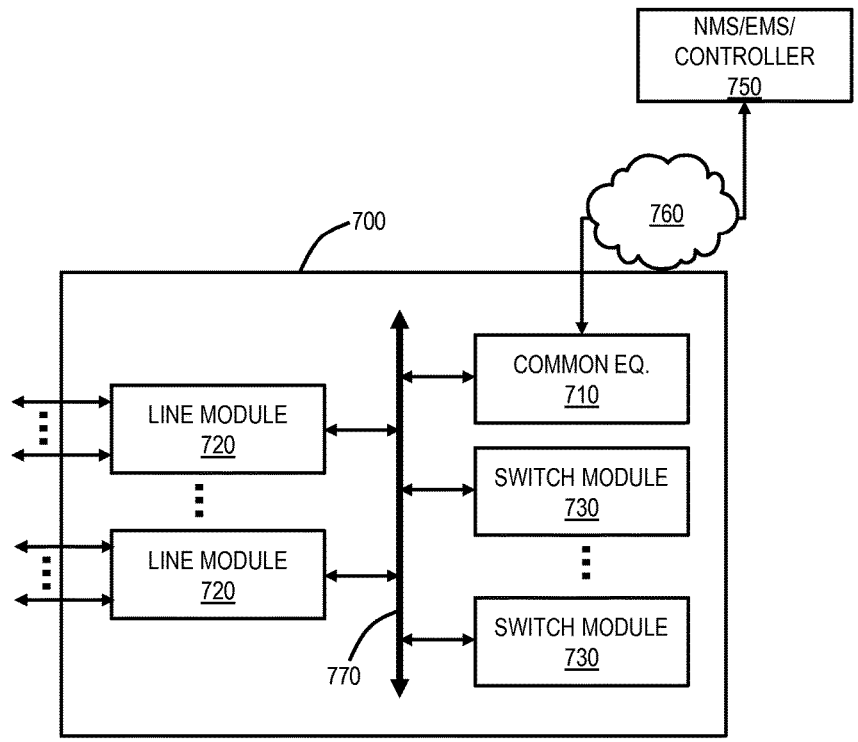
FIG. 11 is a block diagram of an exemplary network element for use with the systems and methods described herein.

Referring to FIG. 11, in an exemplary embodiment, a block diagram illustrates an exemplary network element 700 for use with the systems and methods described herein. In an exemplary embodiment, the exemplary network element 700 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation, i.e. a Packet-Optical Transport System (POTS). In another exemplary embodiment, the network element 700 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the network element 700 can be any digital system with ingress and egress digital signals and switching therebetween of signals, timeslots, tributary units, etc. While the network element 700 is generally shown as an optical network element, the systems and methods contemplated for use with any switching fabric, network element, or network based thereon.

In an exemplary embodiment, the network element 700 includes common equipment 710, one or more line modules 720, and one or more switch modules 730. The common equipment 710 can include power; a control module; operations, administration, maintenance, and provisioning (OAM&P) access; user interface ports; and the like. The common equipment 710 can connect to a management system 750 through a data communication network 760 (as well as a Path Computation Element (PCE), SDN controller, OpenFlow controller, etc.). The management system 750 can include a network management system (NMS), element management system (EMS), or the like. Additionally, the common equipment 710 can include a control plane processor, a shelf controller, etc., such as a controller 800 illustrated in FIG. 30, configured to operate the control plane as described herein and/or to operate general OAM&P for the network element 700. The network element 700 can include an interface 770 for communicatively coupling the common equipment 710, the line modules 720, and the switch modules 730 therebetween. For example, the interface 770 can be a backplane, mid-plane, a bus, optical or electrical connectors, or the like. The line modules 720 are configured to provide ingress and egress to the switch modules 730 and to external connections on the links to/from the network element 700. In an exemplary embodiment, the line modules 720 can form ingress and egress switches with the switch modules 730 as center stage switches for a three-stage switch, e.g. a three stage Clos switch. Other configurations and/or architectures are also contemplated. The line modules 720 can include optical transceivers, transponders, and/or modems, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc. The line modules 720 can include the modems 300.

Further, the line modules 720 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between. The line modules 720 can include wavelength division multiplexing interfaces, short reach interfaces, and the like, and can connect to other line modules 720 on remote network elements, end clients, edge routers, and the like, e.g. forming connections on the links. From a logical perspective, the line modules 720 provide ingress and egress ports to the network element 700, and each line module 720 can include one or more physical ports. The switch modules 730 are configured to switch signals, timeslots, tributary units, packets, wavelengths, etc. between the line modules 720. For example, the switch modules 730 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 730 can include Time Division Multiplexed (TDM) (i.e., circuit switching) and/or packet switching engines. The switch modules 730 can include redundancy as well, such as 1:1, 1:N, etc. In an exemplary embodiment, the switch modules 730 provide OTN switching and/or Ethernet switching.

Those of ordinary skill in the art will recognize the network element 700 can include other components which are omitted for illustration purposes, and that the systems and methods described herein is contemplated for use with a plurality of different network elements with the network element 700 presented as an exemplary type of a network element. For example, in another exemplary embodiment, the network element 700 may not include the switch modules 730, but rather have the corresponding functionality in the line modules 720 (or some equivalent) in a distributed fashion. Alternatively, the network element 700 may not need the corresponding switching functionality in the case of a WDM terminal. For the network element 700, other architectures providing ingress, egress, and switching therebetween are also contemplated for the systems and methods described herein. In general, the systems and methods described herein contemplate use with any network element providing switching of signals, timeslots, tributary units, wavelengths, etc. and using the control plane. Furthermore, the network element 700 is merely presented as one exemplary network element 700 for the systems and methods described herein.

Shelf Controller

Figure 12:
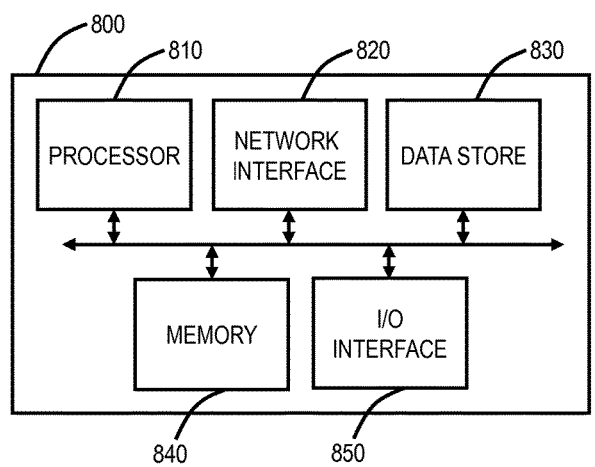
FIG. 12 is a block diagram of a controller to provide control plane processing and/or operations, administration, maintenance, and provisioning (OAM&P) for the network element of FIG. 11.

Referring to FIG. 12, in an exemplary embodiment, a block diagram illustrates a controller 800 to provide control plane processing and/or operations, administration, maintenance, and provisioning (OAM&P) for the network element 700. The controller 800 can be part of common equipment, such as common equipment 710 in the network element 700, or a stand-alone device communicatively coupled to the network element 700 via the DCN 760. The controller 800 can include a processor 810 which is a hardware device for executing software instructions such as operating the control plane. The processor 810 can be any custom made or commercially available processor, a central processing unit (CPU), an auxiliary processor among several processors associated with the controller 800, a semiconductor-based microprocessor (in the form of a microchip or chip set), or generally any device for executing software instructions. When the controller 800 is in operation, the processor 810 is configured to execute software stored within memory, to communicate data to and from the memory, and to generally control operations of the controller 800 pursuant to the software instructions. The controller 800 can also include a network interface 820, a data store 830, memory 840, an input/output (I/O) interface 850, and the like, all of which are communicatively coupled therebetween and with the processor 810.

The network interface 820 can be used to enable the controller 800 to communicate on the DCN 760, such as to communicate control plane information to other controllers, to the management system 750, to the SDN controller 160, and the like. The network interface 820 can include, for example, an Ethernet card (e.g., 10BaseT, Fast Ethernet, Gigabit Ethernet) or a wireless local area network (WLAN) card (e.g., 802.11). The network interface 820 can include address, control, and/or data connections to enable appropriate communications on the network. The data store 830 can be used to store data, such as control plane information, provisioning data, OAM&P data, measured metrics, etc. The data store 830 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 830 can incorporate electronic, magnetic, optical, and/or other types of storage media. The memory 840 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 840 may incorporate electronic, magnetic, optical, and/or other types of storage media. Note that the memory 840 can have a distributed architecture, where various components are situated remotely from one another, but may be accessed by the processor 810. The I/O interface 850 includes components for the controller 800 to communicate with other devices. Further, the I/O interface 850 includes components for the controller 800 to communicate with the other nodes, such as using overhead associated with OTN signals.

In an exemplary embodiment, the controller 800 is configured to communicate with other controllers 800 in the network 100 to operate the control plane for control plane signaling. This communication may be either in-band or out-of-band. For SONET networks and similarly for SDH networks, the controllers 800 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 800 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within the Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within the Optical Channel Data Unit-k (ODUk) overhead. In the present disclosure, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 800 can be configured to operate the control plane in the network 100. That is, the controller 800 is configured to implement software, processes, algorithms, etc. that control configurable features of the network 100, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 800 can include a topology database that maintains the current topology of the network 100 based on control plane signaling and a connection database that maintains available bandwidth on the links again based on the control plane signaling. Again, the control plane is a distributed control plane; thus a plurality of the controllers 800 can act together to operate the control plane using the control plane signaling to maintain database synchronization. In source-based routing, the controller 800 at a source node for a connection is responsible for path computation and establishing by signaling other controllers 800 in the network 100. For example, the originating node and its controller 800 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links through the nodes from the source node to the destination node based on a plurality of constraints such as administrative weights on the links, bandwidth availability on the links, etc.

SDN Controller/Service for the Application

Figure 13:
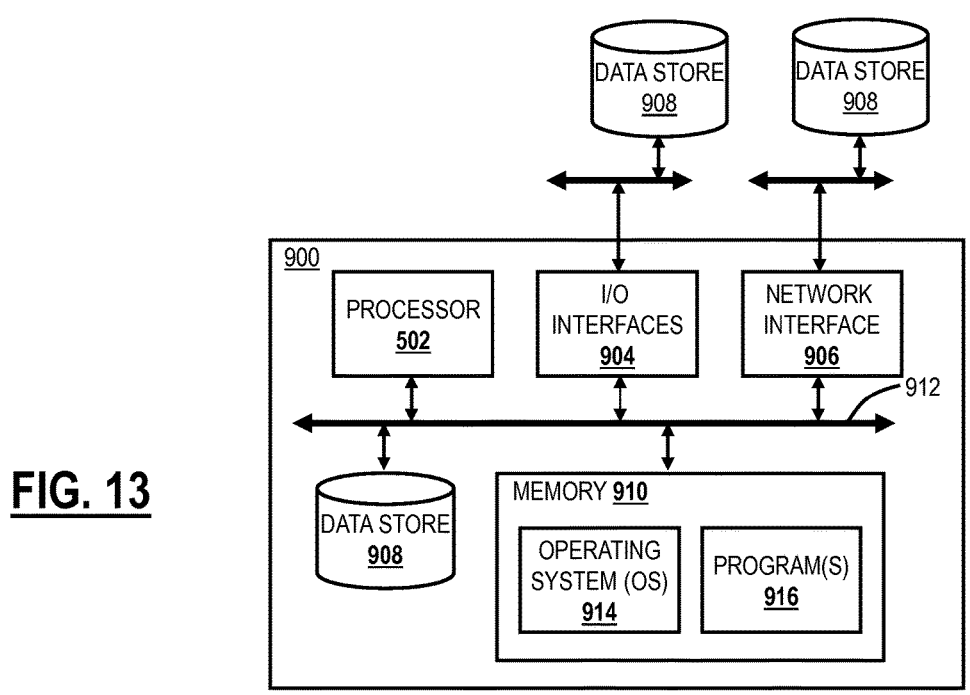
FIG. 13 is a block diagram illustrates a server, such as for an SDN controller.

Referring to FIG. 13, in an exemplary embodiment, a block diagram illustrates a server 900 such as for the SDN controller 160. The server 900 can be a digital computer that, in terms of hardware architecture, generally includes a processor 902, input/output (I/O) interfaces 904, a network interface 906, a data store 908, and memory 910. It should be appreciated by those of ordinary skill in the art that FIG. 13 depicts the server 900 in an oversimplified manner, and a practical embodiment may include additional components and suitably configured processing logic to support known or conventional operating features that are not described in detail herein. The components (902, 904, 906, 908, and 910) are communicatively coupled via a local interface 912. The local interface 912 can be, for example but not limited to, one or more buses or other wired or wireless connections, as is known in the art. The local interface 912 can have additional elements, which are omitted for simplicity, such as controllers, buffers (caches), drivers, repeaters, and receivers, among many others, to enable communications. Further, the local interface 912 can include address, control, and/or data connections to enable appropriate communications among the aforementioned components.

The processor 902 is a hardware device for executing software instructions. The processor 902 can be any custom made or commercially available processor, a central processing unit (CPU), an auxiliary processor among several processors associated with the server 900, a semiconductor-based microprocessor (in the form of a microchip or chip set), or generally any device for executing software instructions. When the server 900 is in operation, the processor 902 is configured to execute software stored within the memory 910, to communicate data to and from the memory 910, and to generally control operations of the server 900 pursuant to the software instructions. The I/O interfaces 904 can be used to receive user input from and/or for providing system output to one or more devices or components. User input can be provided via, for example, a keyboard, touch pad, and/or a mouse. System output can be provided via a display device and a printer (not shown). I/O interfaces 904 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 906 can be used to enable the server 900 to communicate on a network. The network interface 906 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 906 can include address, control, and/or data connections to enable appropriate communications on the network. A data store 908 can be used to store data. The data store 908 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 908 can incorporate electronic, magnetic, optical, and/or other types of storage media. In one example, the data store 908 can be located internal to the server 900 such as, for example, an internal hard drive connected to the local interface 912 in the server 900. Additionally in another embodiment, the data store 908 can be located external to the server 900 such as, for example, an external hard drive connected to the I/O interfaces 904 (e.g., SCSI or USB connection). In a further embodiment, the data store 908 can be connected to the server 900 through a network, such as, for example, a network attached file server.

The memory 910 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 910 can incorporate electronic, magnetic, optical, and/or other types of storage media. Note that the memory 910 can have a distributed architecture, where various components are situated remotely from one another, but can be accessed by the processor 902. The software in memory 910 can include one or more software programs, each of which includes an ordered listing of executable instructions for implementing logical functions. The software in the memory 910 includes a suitable operating system (O/S) 914 and one or more programs 916. The operating system 914 essentially controls the execution of other computer programs, such as the one or more programs 516, and provides scheduling, input-output control, file and data management, memory management, and communication control and related services. The one or more programs 916 may be configured to implement the various processes, algorithms, methods, techniques, etc. described herein.

In an exemplary embodiment, the SDN controller 160 can be implemented through the server 900 where the network interface 908 is communicatively coupled to one or more nodes in a network. The SDN controller 160 can also include an Application Programming Interface (API) which allows additional applications to interface with the SDN controller 160 for data associated with the network. In an exemplary embodiment, one or more applications can be implemented on the server 900 (or on the server 900 operating as the SDN controller 160) for the SDN control plane 200, and receive data through the API. Other configurations are also contemplated.

In an exemplary embodiment, the SDN controller 160 can include one or more of the programs 916 configured to determine dynamic link weights for links in the network, responsive to a request for a path through the network interface, for a connection, between a source node and a destination node in the network with a requested bandwidth amount, wherein the dynamic link weights, for each link, are based on a current status of the link and a future status of the link; determine one or more paths for the request based on the dynamic link weights; and select a path of the one or more paths to minimize cost in the network. The links with insufficient capacity for the requested bandwidth based on the current status or the future status are given a dynamic link weight of infinity or an extremely high value, the dynamic link weights are determined from static link weights assigned to each of the links with a penalty added therein based on the current status and the future status, and the dynamic link weights are computed at run-time for each new request based on the current status and future status at run-time.

The SDN controller 160 can be configured to determine costs of the one or more paths, wherein the cost is determined based on a length of the path, and wherein, if a length of the one or more paths is longer than a prescribed threshold, the cost of the one or more paths is set to infinity or an extremely high value. The path is selected to minimize cost by considering cost to add the connection to the network and the path is rejected for the connection if the cost is too high even if sufficient capacity is available. The SDN controller 160 can be configured to determine a network graph based on a topology of the network with the dynamic link weights assigned to the network graph and with the network graph incorporating multiple network layers therein; the one or more paths are determined using the network graph with the dynamic link weights and an associated path computation algorithm. The dynamic link weights are determined based on modification of static link weights reflecting any of costs of technologies from multiple-layers in the network, current availability of bandwidth in the network, and future availability of bandwidth in the network.

It will be appreciated that the systems and methods described herein contemplate operation with any type of dynamic network management and control such as distributed control planes, centralized control planes, SDN, Network Functions Virtualization (NFV), PCEs, Path Computation Clients (PCCs), and the like. Further, the systems and methods contemplate operation with various different types of management and control concurrently. For example, a controller implementing the systems and methods can actively communicate through messaging with a distributed control plane. Other embodiments are also contemplated. Further, the systems and methods can operate with and/or integrate with network planning systems and methods. Those of ordinary skill in the art will recognize path computation can be performed at various different devices in a network, and the systems and methods described herein contemplate operation at any of these different devices.

It will be further appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for path computation in a network implemented via a controller communicatively coupled to the network, the method comprising:
   determining dynamic link weights for links in the network, responsive to a request for a path, for a connection, between a source node and a destination node in the network with a requested bandwidth amount, wherein the dynamic link weights, for each link, are based on static link weights that are modified with a penalty added therein based on a current status of the link and a future status of the link determined at run-time based on one or more of known future demand, forecast demand, and known future network upgrades, wherein each of the current status and the future status is a utilization value of bandwidth on a link that is used to determine the penalty that discourages use of the links at a first point in time and at a predetermined later point in time;
   determining one or more paths for the request based on the dynamic link weights; and
   selecting a path of the one or more paths to based on cost of the one or more paths using the dynamic link weights in the network.

2. The method of claim 1, wherein links with insufficient capacity for the requested bandwidth based on the current status or the future status are given a dynamic link weight of infinity or an extremely high value.

3. The method of claim 1, wherein the dynamic link weights are computed for each new request based on the current status and future status at a time of the request.

4. The method of claim 1, further comprising:
   determining costs of the one or more paths, wherein the cost is determined based on a length of the path, and wherein, if a length of the one or more paths is longer than a prescribed threshold, the cost of the one or more paths is set to infinity or an extremely high value.

5. The method of claim 1, wherein the future status incorporates any of planned capacity increases, estimated capacity increases, planned traffic, and estimated traffic, for each of the links.

6. The method of claim 1, further comprising:
   determining a network graph based on a topology of the network with the dynamic link weights assigned to the network graph and with the network graph incorporating multiple network layers therein;
   wherein the determining one or more paths utilizes the network graph with the dynamic link weights and an associated path computation algorithm.

7. The method of claim 1, wherein the method is implemented in conjunction with a Software Defined Networking (SDN) controller.

8. The method of claim 1, wherein the dynamic link weights are determined based on link weight adjustment for congestion control which provides a penalty based on link utilization.

9. The method of claim 1, further comprising:
   performing link pruning to remove links without capacity to support the request.

10. The method of claim 1, further comprising:
    determining a path bound or a reservation trigger for a cost threshold used in the selecting step.

11. A controller configured to perform path computation in a network, the controller comprising:
    a network interface communicatively coupled to one or more nodes in the network;
    a processor communicatively coupled to the network interface; and
    memory storing instructions that, when executed, cause the processor to
        determine dynamic link weights for links in the network, responsive to a request for a path through the network interface, for a connection, between a source node and a destination node in the network with a requested bandwidth amount, wherein the dynamic link weights, for each link, are based on static link weights that are modified with a penalty added therein based on a current status of the link and a future status of the link determined at run-time based on one or more of known future demand, forecast demand, and known future network upgrades, wherein each of the current status and the future status is a utilization value of bandwidth on a link that is used to determine the penalty that discourages use of the links at a first point in time and at a later predetermined point in time,
        determine one or more paths for the request based on the dynamic link weights, and
        select a path of the one or more paths to based on cost of the one or more paths using the dynamic link weights in the network.

12. The controller of claim 11, wherein links with insufficient capacity for the requested bandwidth based on the current status or the future status are given a dynamic link weight of infinity or an extremely high value, and wherein the dynamic link weights are computed at run-time for each new request based on the current status and future status at run-time.

13. The controller of claim 11, wherein the memory storing instructions that, when executed, further cause the processor to
determine costs of the one or more paths, wherein the cost is determined based on a length of the path, and wherein, if a length of the one or more paths is longer than a prescribed threshold, the cost of the one or more paths is set to infinity or an extremely high value.

14. The controller of claim 11, wherein the memory storing instructions that, when executed, further cause the processor to
determine a network graph based on a topology of the network with the dynamic link weights assigned to the network graph and with the network graph incorporating multiple network layers therein;
wherein the one or more paths are determined using the network graph with the dynamic link weights and an associated path computation algorithm.

15. A network, comprising:
a plurality of nodes interconnected by a plurality of links; and
a controller communicatively coupled to one or more of the plurality of nodes, wherein the controller is configured to
determine dynamic link weights for links in the network, responsive to a request for a path, for a connection, between a source node and a destination node in the network with a requested bandwidth amount, wherein the dynamic link weights, for each link, are based on a static link weights that are modified with a penalty added therein based on a current status of the link and a future status of the link determined at run-time based on one or more of known future demand, forecast demand, and known future network upgrades, wherein each of the current status and the future status is a utilization value of bandwidth on a link that is used to determine the penalty that discourages use of the links at a first point in time and at a later predetermined point in time,
determine one or more paths for the request based on the dynamic link weights, and
select a path of the one or more paths to based on cost of the one or more paths using the dynamic link weights in the network.

* * * * *